May 27, 1924.
H. D. FIELDS
MEASURING STICK FOR GASOLINE TANKS
Filed Sept. 29, 1923
1,495,292
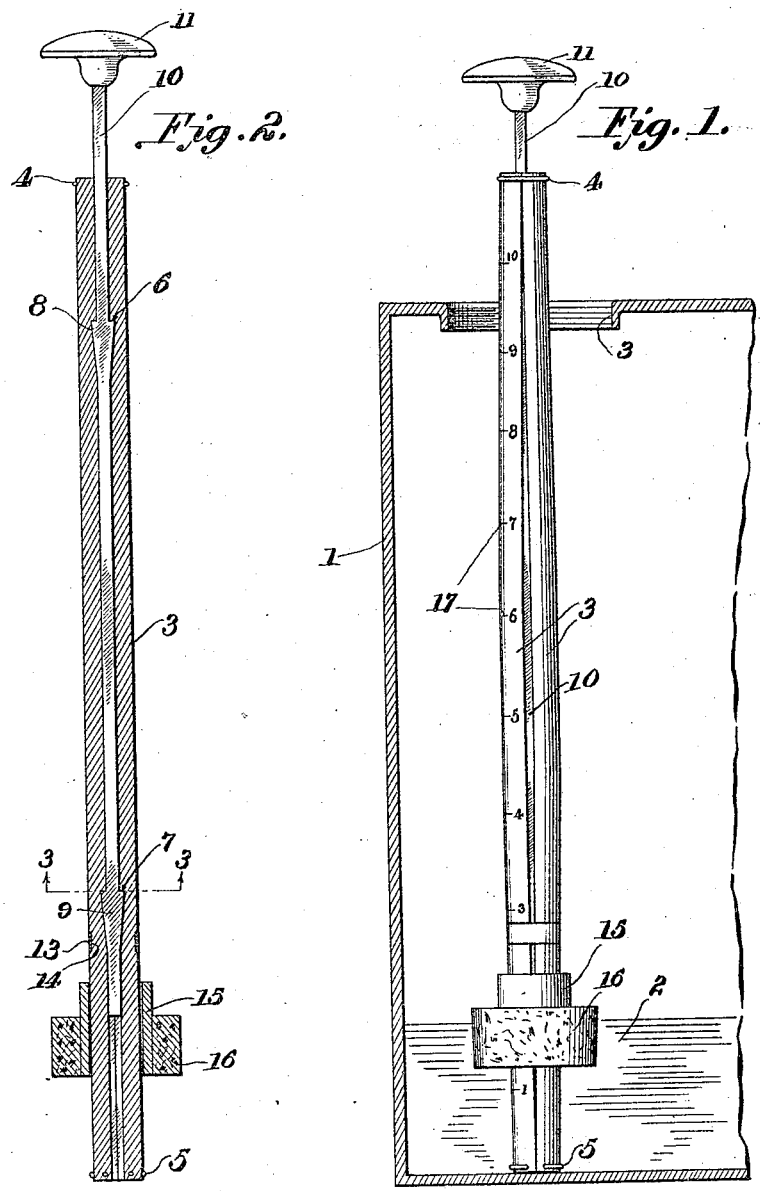
Inventor
Howard D. Fields.

Patented May 27, 1924.

1,495,292

UNITED STATES PATENT OFFICE.

HOWARD D. FIELDS, OF TAMPA, FLORIDA, ASSIGNOR OF ONE-HALF TO HENRY LIEMAN, OF TAMPA, FLORIDA.

MEASURING STICK FOR GASOLINE TANKS.

Application filed September 29, 1923. Serial No. 665,643.

*To all whom it may concern:*

Be it known that HOWARD D. FIELDS, citizen of the United States, residing at Tampa, in the county of Hillsborough and State of Florida, has invented certain new and useful Improvements in Measuring Sticks for Gasoline Tanks; and he does hereby declare the following to be a full, clear, and exact description of the invention, such as will enable others skilled in the art to which it appertains to make and use the same.

This invention relates to measuring sticks for gasoline tanks, and more particularly to a stick which will be positive in operation to indicate the height of the fuel in the tank.

An object of the invention is to provide a measuring stick for gasoline or fuel tanks which will be so constructed that a sliding float on the stick will rise to the level of the fluid in the tank and be positively held at the position it comes to rest by means of a suitable wedge device positioned within said stick.

Another object of the invention is to provide a measuring stick for gasoline or fluid fuel tanks which will be formed of a split tube and having a float slidably positioned about said stick and a wedge device within said stick for causing the float to bind against the sides of the stick upon the bringing into action of the wedging device.

A still further object of the invention is to provide a measuring stick for gasoline or fluid fuel tanks which will be highly efficient in use and quite inexpensive to manufacture.

Other objects will appear as the description proceeds.

In the accompanying drawings which form a part of my application.

Fig. 1 is a front elevation of my improved measuring stick shown in position within a fuel tank;

Fig. 2 is a sectional view through the stick showing the wedging device, and

Fig. 3 is a transverse sectional view on the line 3—3 of Fig. 2.

Like characters of reference are used throughout the following specification and the accompanying drawings to designate corresponding parts.

A fuel tank 1 of any type is adapted to receive gasoline or fluid fuel 2, and has formed at its upper portion the filling opening 3 of usual construction.

My improved measuring stick is formed of a pair of semi-cylindrical body portions 3, which are held together at their upper and lower ends by means of the bands or wires 4 and 5 respectively. When the two semi-cylindrical body portions are held together they form a hollow split tube. Spaced shoulders or recesses 6 and 7 are formed in the opposite inner surfaces of the body portions or members 3, and are adapted to normally receive the wedge portions 8 and 9 respectively, formed integrally in spaced relation on the shank or rod 10, which is vertically slidable within said cylindrical body portions. A suitable handle member 11 is attached at the outer end of the shank 10. The adjacent inner surfaces of the body portions 3 are grooved as at 12 to receive the shank 10.

A split resilient ferrule 13 is adapted to seat within an annular groove 14 formed in the exterior surface of the cooperating body portions 3, in such a manner as to resiliently tension or hold the two body portions adjacent each other.

A tubular collar 15 is slidably mounted upon the body portions 3 and has positioned about it, and affixed thereto a float 16.

One of the body portions 3 may be calibrated as at 17, so that the height of the fluid fuel in the tank 1 may be readily reckoned.

The bands or wires 4 and 5 at the upper and lower ends of the stick extend out sufficiently far to prevent the collar 15 and float 16 from being removed from the said stick.

The mode of operation will be as follows:

The stick will be inserted into the tank 1 until it rests upon the bottom thereof, whereupon the float 12 will rise to the height of the fluid fuel contained in the tank. The shank 10 will then be forced a slight distance downwardly which will cause the wedged portions 8 and 9 to cooperate with the adjacent body portions 3 to force the same apart. This action will cause the collar 15 to bind against the outer walls of the body portions so that the same will be held in fixed position. The stick will then be withdrawn from the tank and the reading may be easily and correctly ascertained.

Many minor changes in detail of construction may be resorted to without departure from the spirit of the invention.

Having thus described my invention what I claim as new and desire to secure by Letters Patent of the United States is:

1. A measuring stick for fluid tanks comprising a split tubular member, a float slidable thereon and means for spreading said split member to wedge or bind said float on said member.

2. A measuring stick for fluid tanks comprising split hollow members, means at the opposite ends thereof for holding the same together, a float slidably mounted upon said members, and means within said members for expanding the same to bind said float upon said member.

3. A measuring stick for fluid tanks comprising split hollow members, a float slidable thereon, a shank vertically slidable within said body members and complemental wedge portions formed on said shank and interior of said members whereby said float may be caused to bind on said members when expanded.

4. A measuring stick for gasoline tanks comprising cooperating split members, means at the opposite ends thereof for holding the same together, a float slidable on said members, a split resilient ferrule positioned about said members intermediate their ends and a vertically operable wedging means in said members for extending the same to cause said float to bind against the same.

5. A measuring stick for gasoline tanks comprising cooperating semi-cylindrical body portions, means at the opposite ends thereof for holding the same together, said body portions being provided on their inner surfaces with grooves and spaced shoulders, split resilient ferrule positioned about said body portions, a collar slidably mounted on said body portions, a float carried by said collar, a shank provided with spaced wedged portions adapted to slide within said body portions, said wedged portions being adapted to be received or set against said internal shoulders and a handle member formed at the free end of said shank substantially as described.

In testimony whereof I affix my signature.

HOWARD D. FIELDS.